United States Patent [19]

Motooka

[11] Patent Number: 5,730,440
[45] Date of Patent: Mar. 24, 1998

[54] SUCTION FEEDER

[75] Inventor: Eiji Motooka, Wakayama, Japan

[73] Assignee: Noritsu Koki Co., Ltd., Wakayama, Japan

[21] Appl. No.: 726,204

[22] Filed: Oct. 4, 1996

[30] Foreign Application Priority Data

Oct. 20, 1995 [JP] Japan ............................ 7-272929

[51] Int. Cl.⁶ ............................. B65H 5/02; B65H 29/32
[52] U.S. Cl. ............................................. 271/276; 271/197
[58] Field of Search ............................. 271/94, 96, 196, 271/197, 276

[56] References Cited

U.S. PATENT DOCUMENTS

| 3,563,532 | 2/1971 | Street | 271/96 |
| 5,564,693 | 10/1996 | Elkis et al. | 271/276 |

FOREIGN PATENT DOCUMENTS

| 0 628 855 | 12/1994 | European Pat. Off. | |
| 403293253 | 12/1991 | Japan | 271/276 |
| 406001467 | 1/1994 | Japan | 271/94 |

OTHER PUBLICATIONS

Patent Abstracts of Japan, vol. 18, No. 362 (P-1766), 7 Jul. 1994 & JP 06 095294 A (Konica Corp), 8 Apr. 1994 * Abstract *.

Patent Abstracts of Japan, vol. 95, No. 008, 29 Sep. 1995 & JP 07 114113 A (Fuji Photo Film Co. Ltd.), 2 May 1995 * Abstract *.

*Primary Examiner*—H. Grant Skaggs
*Attorney, Agent, or Firm*—Wenderoth, Lind & Ponack

[57] ABSTRACT

A suction feeder can feed photosensitive material sheets of different sizes with the suction force applied thereto kept substantially constant. The suction feeder has a motor-driven endless suction belt having numerous suction holes formed uniformly over the entire area thereof. A suction box is provided under the carrier side of the suction belt and has a belt supporting plate formed with suction holes. A motor-driven blower is connected to the suction box. The suction pressure applied to the suction holes of the suction belt through the suction holes in the belt supporting plate is reduced by reducing the revolving speed of the blower-driving motor with an increase in the size of the photosensitive material sheet fed onto the carrier side of the suction belt. It is thus possible to apply substantially constant suction force to photosensitive material sheets of different sizes.

13 Claims, 5 Drawing Sheets

SUCTION FEEDER

BACKGROUND OF THE INVENTION

This invention relates to a suction feeder for use in a printer for feeding photosensitive material while holding the material by suction.

Conventional printers for printing images on negative film onto photosensitive material and developing the latter include a type in which a web of photosensitive material pulled out of a paper roll is cut to a plurality of sheets, which are then fed to an exposure unit for printing and then into a developing unit to develop the printed sheets of photosensitive material.

A suction feeder is used to feed sheets of photosensitive material. FIG. 6 shows a conventional suction feeder. It comprises an endless suction belt 2 driven by a motor 1 and having numerous suction holes 3 formed uniformly over the entire area thereof, and a suction box 4 including a belt support plate 5 supporting the carrier side 2a of the suction belt 2 and formed with suction holes 6. A blower 7 draws the air in the suction box 4 to create a suction force at the suction holes 3. The suction force attracts a sheet of photosensitive material P1 on the carrier side 2a of the belt to the belt. The sheet P1 is thus fed to the exposure unit by the belt 2.

A similar suction feeder is also used to feed sheets of photosensitive material P1 that have been printed in the exposure unit to the developing unit.

Photosensitive material P1 is prepared in the form of paper rolls having several different widths. According to the print size, a paper roll with a suitable width is selected and used.

If, in the above-described conventional suction feeder, the suction force applied to the suction holes 3 of the suction belt 2 is determined based on a sheet of photosensitive material P1 with a maximum size, a suction force applied to a sheet P1 with a minimum size would be too small to feed it reliably with high accuracy. Thus, the suction force applied to the suction holes 3 is determined based on the smallest sheet P1. But in this case, the suction force tends to be too great if a larger sheet P1 is fed. The sheet is thus pressed so hard against the belt that undesired marks tend to be imprinted thereon.

Also, the larger the size of the sheet P1, the harder the suction belt 2 is pressed against the belt support plate 5. Thus, it is necessary to use a larger, higher-power motor 1 to drive the belt. This makes the conventional feeder bulky and costly.

An object of this invention is to provide a suction feeder which can stably feed photosensitive material sheets of different sizes without damaging them, and which can use a small motor as the belt driving motor.

SUMMARY OF THE INVENTION

According to this invention, there is provided a suction feeder for feeding photosensitive material comprising an endless suction belt formed with numerous suction holes arranged uniformly over the entire area thereof, a motor for driving the suction belt, a suction box having a belt supporting plate for supporting a carrier side of the suction belt, the supporting plate being formed with suction holes, a blower for creating a suction force in the suction box, a motor for driving the blower to draw air in the suction box to apply suction force to the suction holes formed in the suction belt, thereby attracting a photosensitive material fed on the carrier side of the suction belt to the suction belt, and a suction force control means for variably controlling the suction pressure applied to the suction holes formed in the suction belt according to the size of a photosensitive material placed on the carrier side of the suction belt.

The suction force control means may be one which can variably control the revolving speed of the motor for driving the blower according to the size of a photosensitive material placed on the carrier side of the suction box.

Also, the suction force control means may comprise vent holes formed in a peripheral wall of the suction box, a shutter slidably mounted on the peripheral wall of the suction box, opposite to the vent holes, and a driving means for moving the shutter to variably control the degree of opening of the vent holes according to the size of a photosensitive material placed on the carrier side of the suction box.

Other features and objects of the present invention will become apparent from the following description made with reference to the accompanying drawings, in which:

DETAILED DESCRIPTION OF THE PREFERRED EMBODIMENT

Embodiments of this invention will now be described with reference to FIGS. 1–5.

Figure 1:
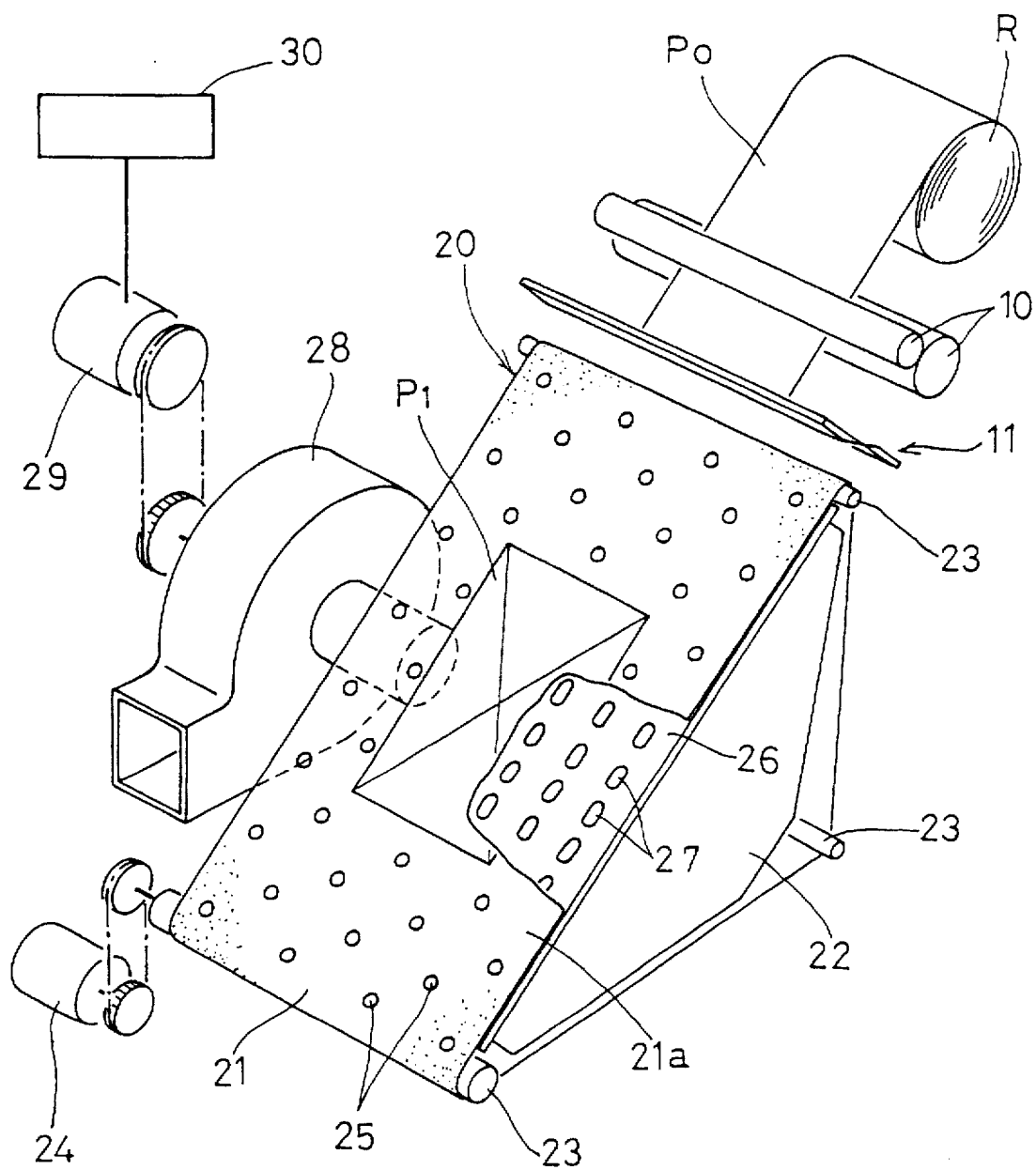
FIG. 1 is a perspective view of an embodiment of this invention.
Figure 2:
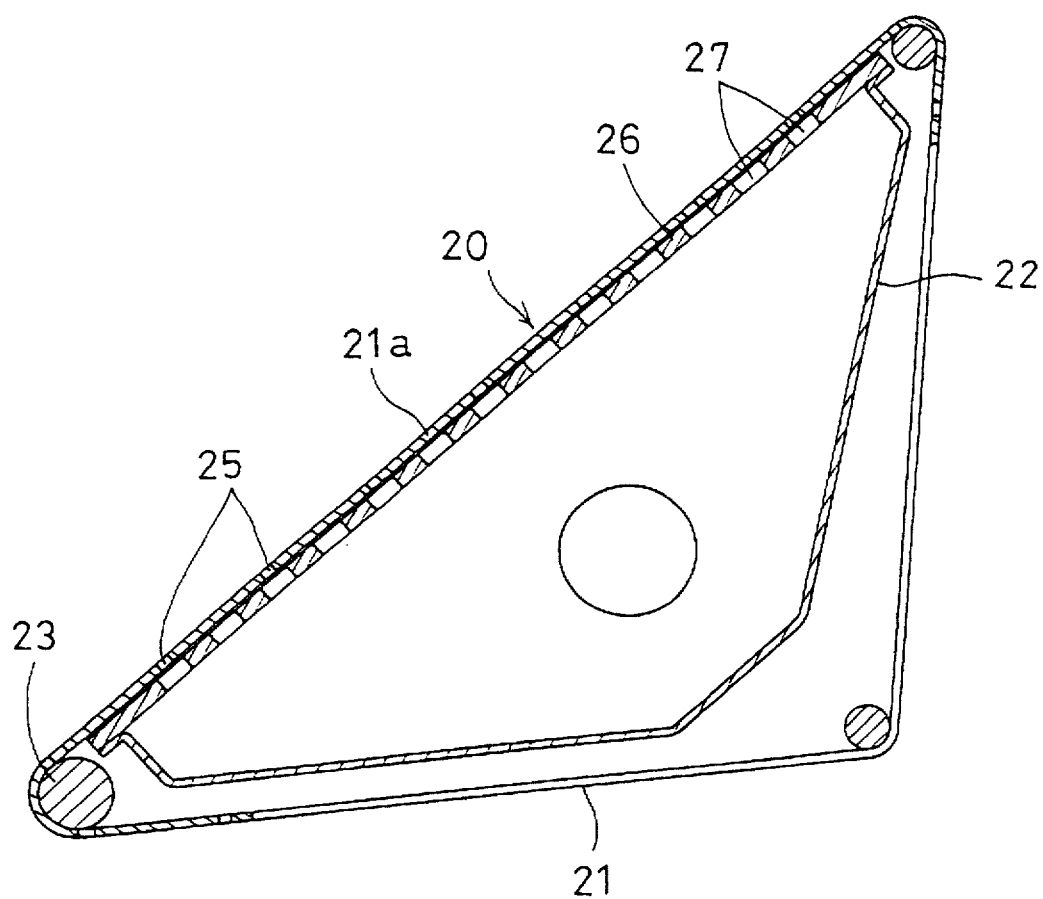
FIG. 2 is a sectional view thereof.

As shown in FIGS. 1 and 2, a web of photosensitive material P0 pulled out of a paper roll R by a pair of feed rolls 10 is cut to predetermined lengths into sheets by a cutter 11.

The sheets P1 thus cut are fed in one direction by a suction feeder 20 provided downstream of the cutter 11.

The suction feeder 20 comprises an endless suction belt 21, and a suction box 22 provided under the carrier side 21a of the belt 21.

The suction belt 21 extends around a plurality of rollers 23 and is driven by a motor 24. Belt 21 has numerous suction holes 25 formed uniformly over the entire area thereof.

The suction box 22 has a belt supporting plate 26 supporting the carrier side 21a of the belt 21 and formed with suction holes 27.

A blower 28 is connected to the suction box 22 and is driven by a motor 29. By driving the blower 28 with the motor 29, the air in the suction box 22 is drawn, so that a suction force is applied to the suction holes 25 in the carrier side 21a of the belt 21 through the suction holes 27 formed in the belt supporting plate 26. A sheet of photosensitive material P1 on the carrier side 21a of the belt is thus attracted to the belt.

With the sheet P1 attracted to the suction belt 21, the belt is moved by driving the motor 24 to feed the sheet P1.

If the suction force applied to the suction holes 25 is determined based on a sheet P1 with a minimum size, the suction force applied to the sheet will increase in proportion to the size of the sheet, because a larger sheet closes a greater number of suction holes 25.

In order that a substantially constant suction force can be applied to a sheet of any size, the suction feeder of this embodiment has a controller 30 for controlling the blower driving motor 29. Controller 30 controls the motor 29 so that it will rotate at a correspondingly decreased speed as the size of the sheet P1 on the belt increases.

By variably controlling the revolving speed of the blower driving motor 29 according to the size of the sheet P1, it is possible to apply a substantially constant suction force to sheets of different sizes.

It is thus possible to feed sheets of photosensitive material P1 without the possibility of undesired marks being imprinted thereon. Also, the contact pressure between the suction belt 21 and the belt supporting plate 26 can be kept substantially constant. This makes it possible to use a small, low-power motor as the belt driving motor 24.

Figure 3:
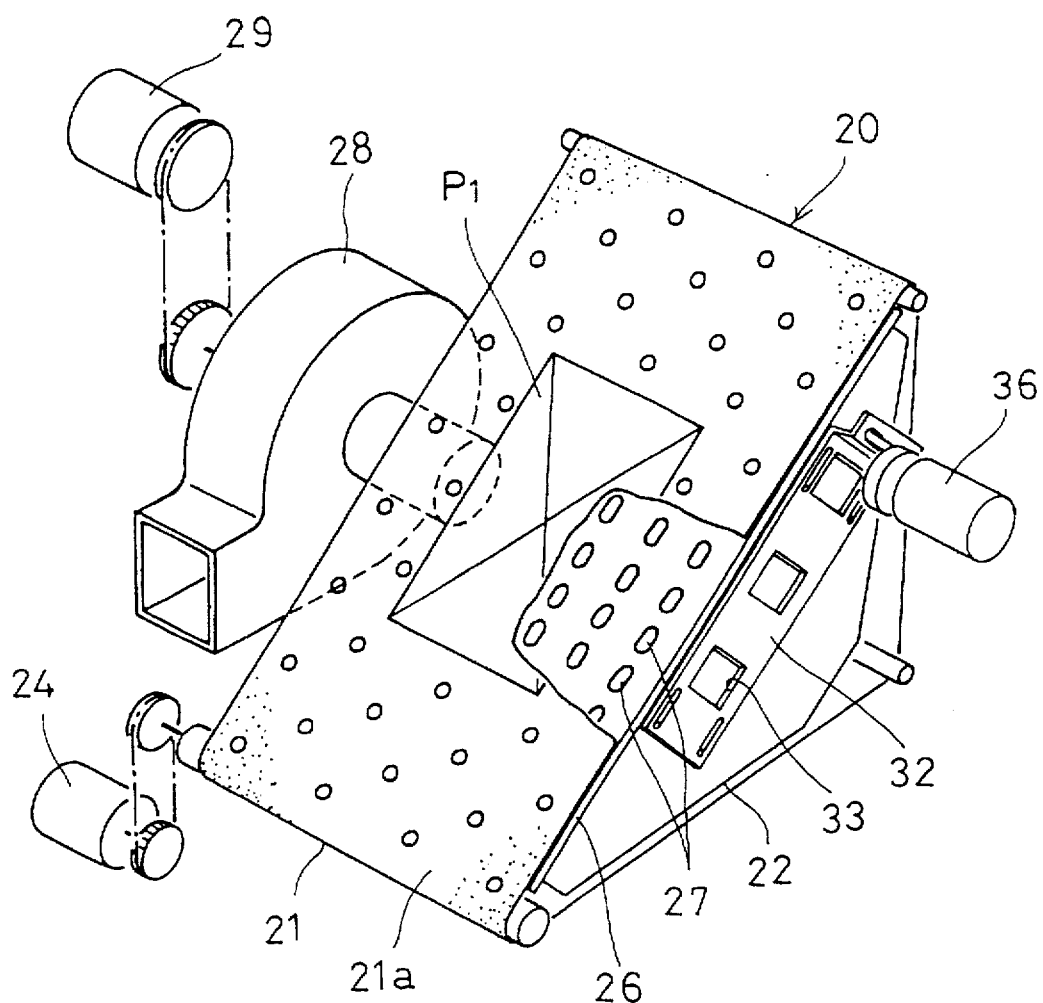
FIG. 3 is a perspective view of another embodiment of this invention.
Figure 4:
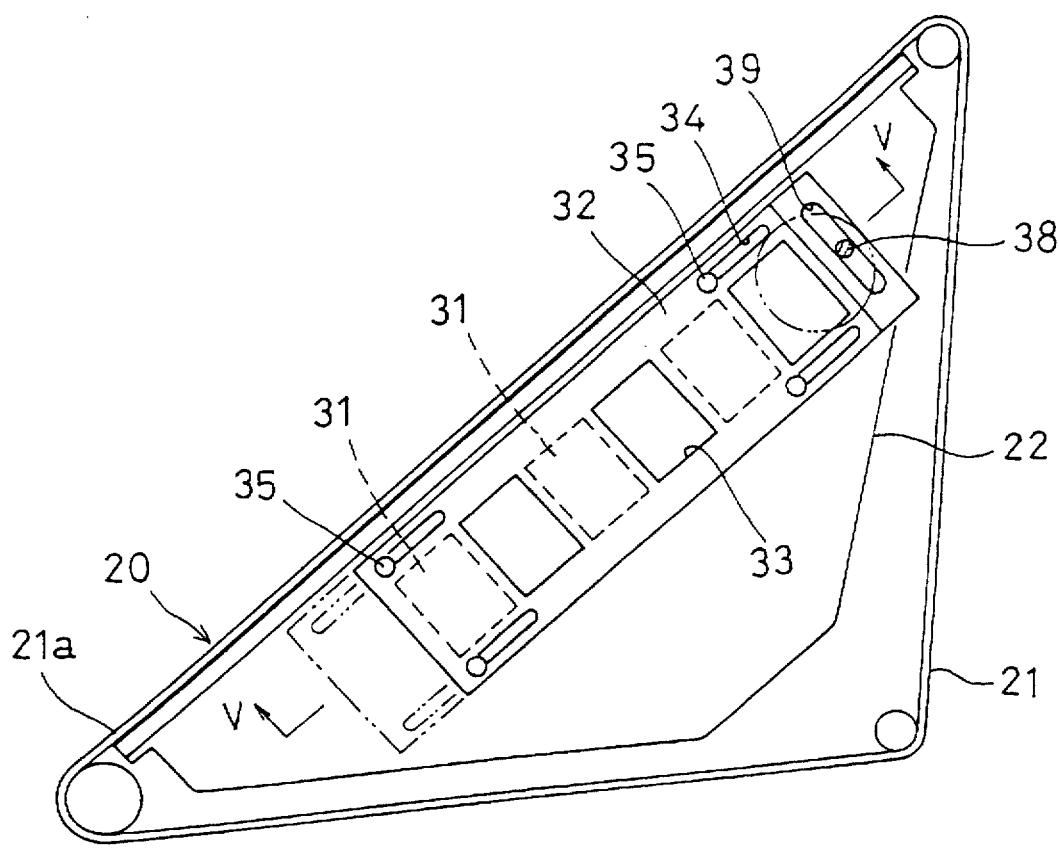
FIG. 4 is a side view thereof.
Figure 5:
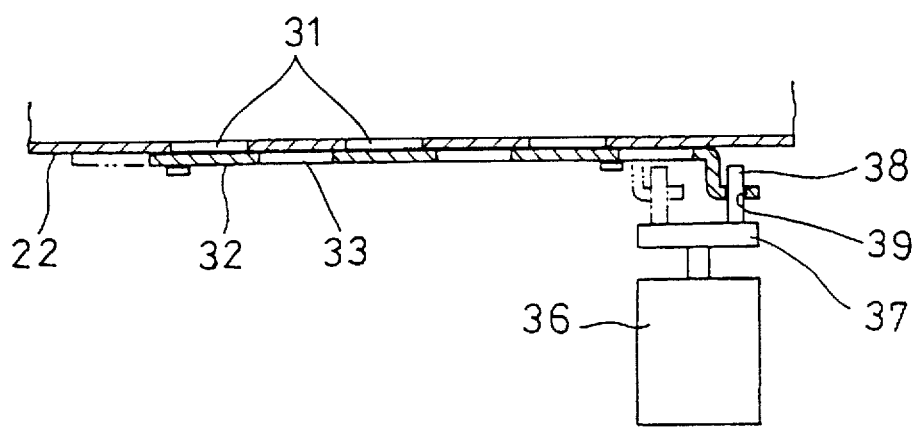
FIG. 5 is a sectional view taken along line V—V of FIG. 4.
Figure 6:
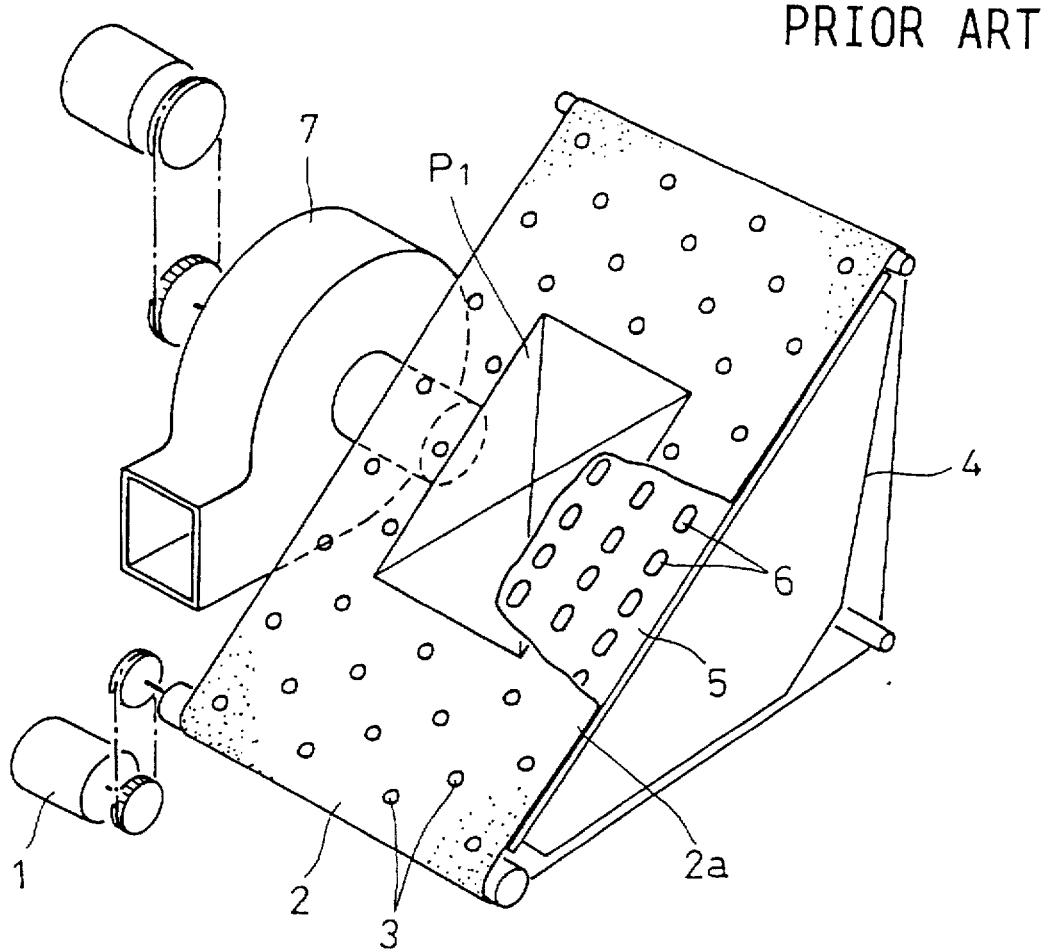
FIG. 6 is a perspective view of a conventional suction feeder.

FIGS. 3–5 show a different type of suction force control means for variably controlling the suction force according to the sheet size. This control means comprises a plurality of vent holes 31 formed in one of the side walls of the suction box 22 and arranged or spaced in one direction at predetermined intervals, and a shutter 32 for opening and closing the vent holes 31. The shutter 32 is slidably superposed on the side wall of the suction box 22 and has windows 33 provided opposite to the vent holes 31. The shutter 32 is moved so that the degree of opening of the vent holes 31 increases as the size of the sheet P1 increases.

The shutter 32 has holes 34 elongated in the direction in which the vent holes 31 are arranged or spaced. Pins 35 provided on the side wall of the suction box 22 are received in the elongated holes 34 to movably support the shutter 32.

A means for moving the shutter 32 comprises a motor 36, a disk 37 rotated by the motor 36, and a crank pin 38 provided on the disk 37 near its outer circumference and received in an elongated hole 39 formed in the shutter 32.

By increasing the degree of opening of vent holes 31 with an increase in the size of the sheet P1, the amount of air flowing into the suction box 22 through the vent holes 31 increases with the size of the sheet P1.

Thus, it is possible to reduce the suction force applied to the suction holes 25 with increase in the size of the photosensitive material sheet P1, while keeping the revolving speed of the blower driving motor 29 unchanged.

The suction force applied to the suction holes 25 may be variably controlled by adjusting both the revolving speed of the blower driving motor 29 and the degree of opening of the vent holes 31.

According to this invention, a means is provided for reducing the suction force applied to the suction holes formed in the suction belt with increase in the size of the photosensitive material placed on the carrier side of the suction belt. Thus, the suction force applied to the photosensitive material is kept substantially constant irrespective of the size of the photosensitive material.

This makes it possible to prevent undesired marks from being imprinted on the photosensitive material and to stably and reliably feed photosensitive material sheets of different sizes.

Since the suction force applied to the suction belt is kept substantially constant irrespective of the size of the photosensitive material, it is possible to use a smaller motor and thus to reduce the cost and size of the entire device.

What is claimed is:

1. A suction feeder for feeding sheets of material, said suction feeder comprising:

an endless suction belt formed over the entire area thereof with a plurality of suction holes;

a suction box including a belt supporting plate formed with suction holes and supporting a carrier side of said suction belt;

a motor for driving said suction belt;

a suction source connected to said suction box for creating therein a suction force to be applied through said suction holes in said belt supporting plate and said carrier side of said suction belt to thereby attract a sheet of material fed thereon;

said suction box including a side wall that is not covered by said suction belt, said side wall having therein at least one vent hole separate from said suction holes of said belt supporting plate; and a shutter slidably mounted on said side wall for movement relative thereto to relatively close and open said at least one vent hole.

2. A suction feeder as claimed in claim 1, further comprising driving means for moving said shutter relative to said side wall to variably control the degree of opening and closing of said at least one vent hole and to thereby variably control said suction force in said suction box and applied through said suction holes in said belt supporting plate and said suction belt to the sheet of material.

3. A suction feeder as claimed in claim 2, wherein said driving means is operable to control said degree of opening and closing of said at least one vent hole as a function of the size of the sheet of material on said carrier side of said suction belt.

4. A suction feeder as claimed in claim 3, wherein said driving means is operable to relatively open said at least one vent hole and thereby to reduce said suction force as the size of the sheet of material increases.

5. A suction feeder as claimed in claim 1, wherein said side wall is immovable relative to said belt supporting plate.

6. A suction feeder as claimed in claim 1, wherein said side wall extends at an angle relative to said belt supporting plate.

7. A suction feeder as claimed in claim 1, comprising plural vent holes in said side wall.

8. A suction feeder as claimed in claim 7, wherein said plural vent holes are spaced at intervals in a rectilinear direction.

9. A suction feeder as claimed in claim 8, wherein said shutter has therein windows.

10. A suction feeder as claimed in claim 9, wherein said windows are spaced at intervals in a direction parallel to said rectilinear direction.

11. A suction feeder as claimed in claim 10, wherein said intervals of spacing of said windows is equal to said intervals of spacing of said vent holes.

12. A suction feeder as claimed in claim 7, wherein said shutter has therein windows.

13. A suction feeder as claimed in claim 1, wherein said shutter has a length less than a length of said belt supporting plate.

* * * * *